(12) United States Patent
Oliver

(10) Patent No.: US 7,866,428 B1
(45) Date of Patent: Jan. 11, 2011

(54) TWO PERSON GOLF CART

(76) Inventor: Mitchell R. Oliver, Box 768, Standish, MI (US) 48658

( * ) Notice: Subject to any disclaimer, the term of this patent is extended or adjusted under 35 U.S.C. 154(b) by 53 days.

(21) Appl. No.: 12/245,676

(22) Filed: Oct. 3, 2008

Related U.S. Application Data

(60) Provisional application No. 60/977,250, filed on Oct. 3, 2007.

(51) Int. Cl.
*B62D 1/00* (2006.01)
(52) U.S. Cl. .............. 180/208; 280/DIG. 5; 280/32.7; 280/771; 280/93.502; 280/93.513
(58) Field of Classification Search .............. 180/65.1, 180/907, 908, 208; 280/DIG. 5, 32.7, 643, 280/771, 774, 93.502, 93.513; 296/26.08
See application file for complete search history.

(56) References Cited

U.S. PATENT DOCUMENTS

| | | | | |
|---|---|---|---|---|
| 5,064,209 A | * | 11/1991 | Kurschat | 280/204 |
| 5,732,788 A | * | 3/1998 | Brown | 180/326 |
| 6,139,032 A | * | 10/2000 | Hartman | 280/32.7 |
| 6,231,067 B1 | * | 5/2001 | Johnson et al. | 280/650 |
| 7,121,623 B2 | * | 10/2006 | Fujihara et al. | 297/243 |
| 2003/0019684 A1 | * | 1/2003 | Wucherpfennig et al. | 180/330 |
| 2006/0000664 A1 | * | 1/2006 | Huang et al. | 180/907 |
| 2006/0103126 A1 | * | 5/2006 | Miller | 280/781 |
| 2007/0063502 A1 | * | 3/2007 | Greig et al. | 280/771 |

* cited by examiner

*Primary Examiner*—Ruth Ilan
(74) *Attorney, Agent, or Firm*—Robert L. Farris; Farris Law, P.C.

(57) ABSTRACT

The golf cart has a main frame supported by driven rear wheels. A front axle with steered front wheels is pivotally attached to the main frame. A rear seat is pivotally attached to the main frame. The rear seat is pivotable to positions in which a physically challenged golfer can swing a club while supported by the rear seat and hit a ball on the left side, the right side or to the rear of the cart. A front seat is on a front seat post clamped to the frame. A tiller is pivotally attached to the front post. A drive sprocket is fixed to the tiller. A driven sprocket is journaled on the post. A roller chain is trained around the drive sprocket and the driven sprocket. A tie rod control arm is fixed to the driven sprocket and connected to the steered front wheels by tie rods.

11 Claims, 5 Drawing Sheets

TWO PERSON GOLF CART

CROSS REFERENCE TO RELATED APPLICATION

This application claims the benefit of the filing date of U.S. Provisional Application No. 60/977,250, titled TWO PERSON GOLF CART, filed Oct. 3, 2007.

TECHNICAL FIELD

The golf cart has a front operators seat over a front axle, a steering tiller shaft forward of the front axle and a rear seat directly behind the front operators seat that pivots 360° about a vertical axis and supports a physically challenged golfer while swinging a golf club and hitting a golf ball.

BACKGROUND OF THE INVENTION

One person golf carts for physically challenged golfers are known. These golf carts have a seat that pivots about a vertical axis. The seat pivots to a forward facing position during travel to a tee or to a golf ball. The seat is pivoted about the vertical axis to permit the golfer to swing a golf club and hit a golf ball that is on the left side, the right side or to the rear of the golf cart. The golfer can swing the golf club while seated or while standing, but supported by the seat.

The golf cart for physically challenged individuals permits golfers with some physical conditions to continue to play golf. Without a golf cart with a seat that pivots about a vertical axis, some challenged golfers would not be able to play golf.

There are golfers that need a person with them to provide additional assistance due to some infirmity. Other golfers would like to have company.

Golf carts for two golfers generally have side by side seating. Due to the width of such golf carts it is difficult to provide a seat that supports a golfer on either side of the vehicle.

SUMMARY OF THE INVENTION

The two person golf cart includes a rear seat and a front seat. The rear seat is for a physically challenged golfer who does not drive the golf cart. The golf cart is relatively narrow so that the golfer can hit a golf ball while sitting on the rear seat and the ball is on the right side the left side or to the rear of the cart. The physically challenged golfer can also hit a golf ball with a golf club while his feet are on the ground and his weight is partly supported by the seat and the seat belt.

The two person golf cart includes a main frame. A main frame rear portion is supported by a left driven rear wheel and a right driven rear wheel. A front axle is pivotally attached to the main frame by a pivot pin or bolt for pivotal movement about a generally horizontal fore and aft axis. A left spindle and yoke assembly includes a left yoke that is pivotally attached to a front axle left end by a left king pin for pivotal movement about a generally vertical left king pin axis. A left arm is integral with the left spindle and yoke assembly and extends forwardly from the left spindle and yoke assembly. A left steered front wheel journaled on a left spindle of the left spindle and yoke assembly and supports the front axle left end. A right spindle and yoke assembly includes a right yoke that is pivotally attached to a front axle right end by a right king pin for pivotal movement about a generally vertical right king pin axis. A right arm is integral with the right spindle and yoke assembly and extends forwardly from the right spindle and yoke assembly. A right steered front wheel is journaled on a right spindle of the right spindle and yoke assembly and supports the front axle right end.

A rear seat is pivotally attached to the main frame for pivotal movement about a vertical axis to position physically challenged golfers in positions to swing golf clubs and hit golf balls on a left side, a right side, or to the rear of the two person golf cart while at least partially supported by the rear seat and a seat belt.

A front seat post is clamped to a forward portion of the main frame. A foot platform support beam assembly is welded to a front post lower portion and extends forwardly and upwardly from the lower end of the front seat post. A front foot rest is secured to the foot platform support beam assembly. A steering tiller is journaled on the foot platform support beam assembly for pivotal movement about a tiller axis that extends upwardly and rearwardly. A drive sprocket is fixed to the steering tiller adjacent to a bottom side of the foot platform support beam assembly and is pivotable about the tiller axis together with the steering tiller.

A driven sprocket is mounted on a driven sprocket shaft that is journaled on the front seat post to the rear of the drive sprocket for pivotal movement about a driven sprocket shaft axis that is parallel to the tiller axis. A tie rod control arm is fixed to the driven sprocket shaft and the driven sprocket. The driven sprocket and the tie rod control arm are pivotable with the driven sprocket shaft and the driven sprocket about the driven sprocket shaft axis.

An endless roller chain is trained around the drive sprocket and the driven sprocket. An idler sprocket is journaled on the foot platform support beam assembly and engages the endless roller chain between the drive sprocket and the driven sprocket. The position of the idler sprocket is adjustable to tension the endless roller chain.

A left tie rod is connected to the left arm of the left spindle and yoke assembly and to the tie rod control arm by a left tie rod outer end ball joint and a left tie rod inner end ball joint. A right tie rod is connected to the right arm of the right spindle and yoke assembly and to the tie rod control arm by a right tie rod outer ball joint and a right tie rod inner ball joint. Pivotal movement of the steering tiller pivots the left spindle and yoke assembly and the right spindle and yoke assembly relative to the front axle. A front seat is mounted on a front seat post upper end with the front seat above the front foot support plate.

A rear foot rest surface of the rear foot rest extends forward and under the front seat.

The generally horizontal fore and aft axis about which the front axle pivots, the vertical axis about which the rear seat rotates and the tiller axis are in a common vertical plane through a fore and aft center of the two person golf cart.

The front seat of the two person golf cart includes a front seat bottom cushion and a front seat back rest. The front seat back rest is pivotally attached to the front seat bottom cushion for pivotal movement between an upright use position and a generally horizontal forward storage position. In the forward storage position, the seat back is substantially parallel to a top surface of the seat bottom cushion.

BRIEF DESCRIPTION OF THE DRAWINGS

The presently preferred embodiment of the invention are disclosed in the following description and in the accompanying drawings, wherein.

DESCRIPTION OF THE PREFERRED EMBODIMENT

Figure 1:
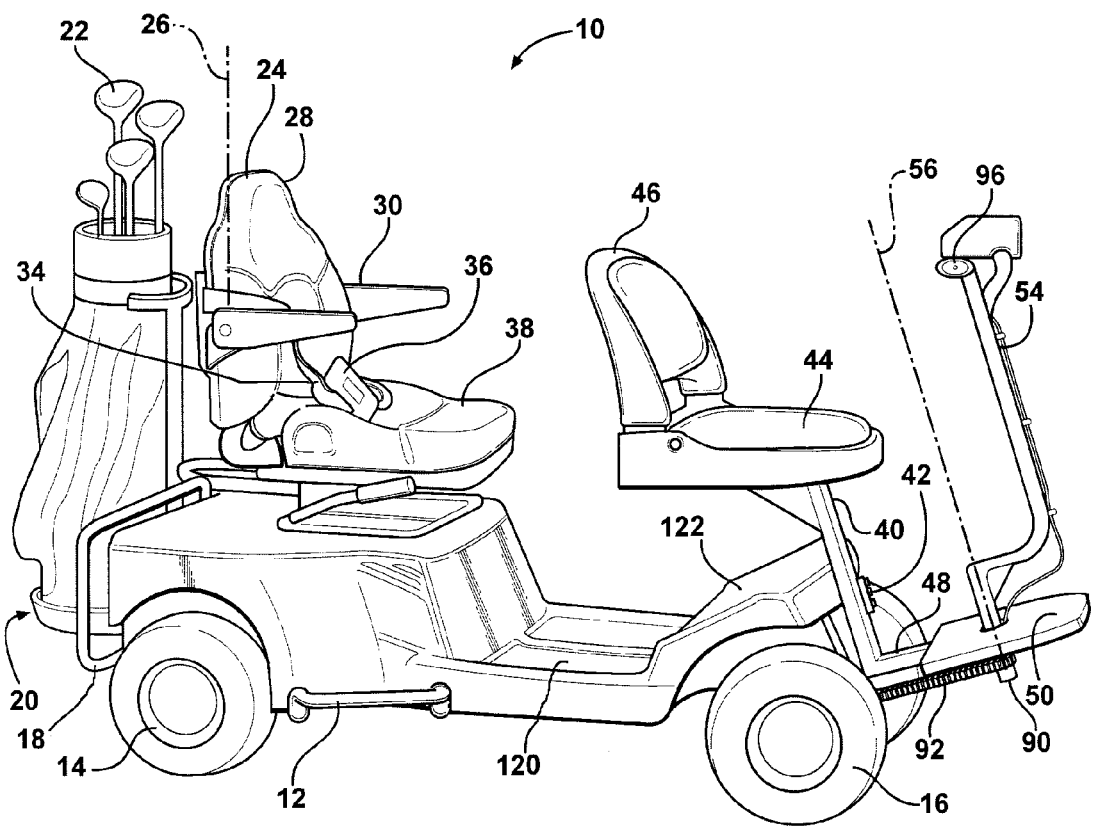
FIG. 1 is a perspective view showing the right side and the front of the two person golf cart.

The two person golf cart 10 has a mainframe 12 supported by two driven rear wheels 14 and two steered front wheels 16. Each of the driven wheels 14 are driven by electric motors. The driven wheels 14 can, as an alternative, be driven by a transaxle and one electric motor. A third possible drive includes a hydraulic motor driving each rear wheel and a hydraulic pump driven by an electric motor supplying hydraulic fluid to the hydraulic motors. A storage stand 18 is secured to the rear of mainframe 12. The storage stand 18 supports the two person golf cart 10 when the cart is moved from a horizontal position supported by the wheels 14 and 16 to a vertical position.

Figure 2:
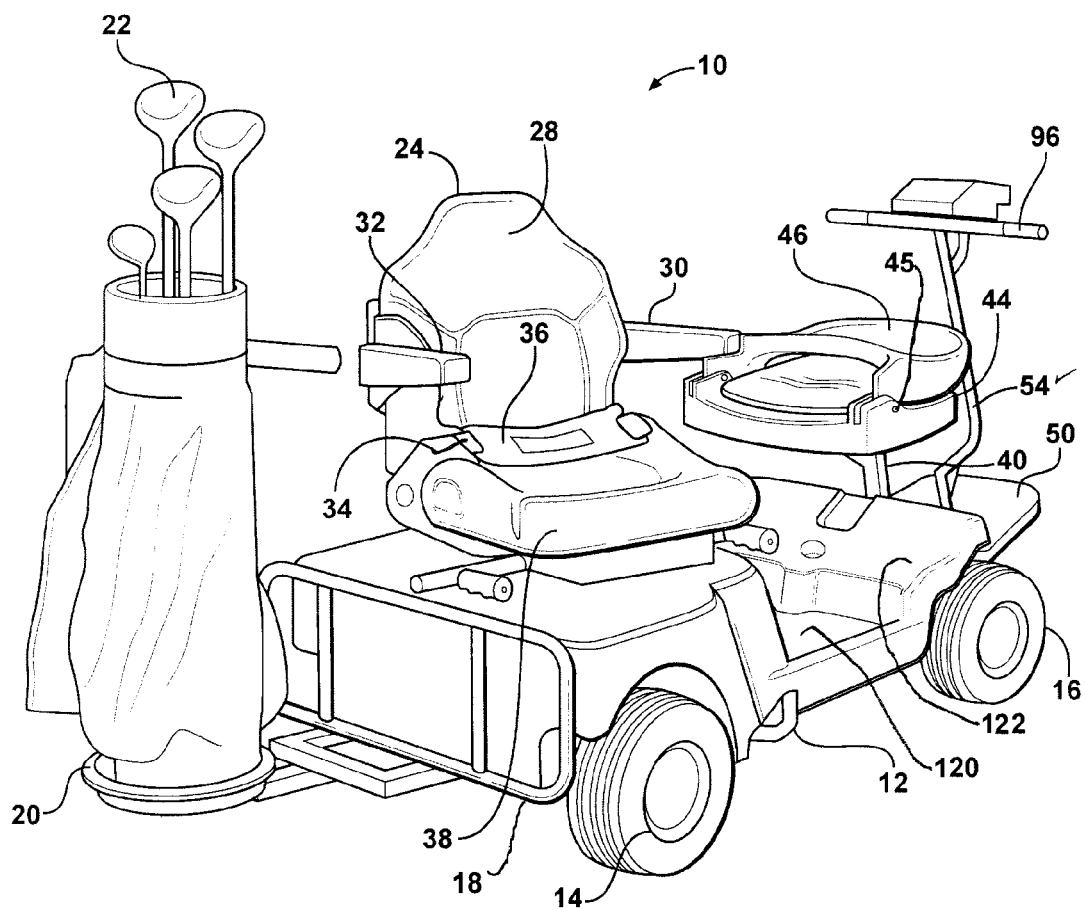
FIG. 2 is a perspective view showing the right side and the rear of the two person golf cart with the rear seat turned to a position for a golfer hitting a golf ball on the right side of the cart and near the cart rear end.
Figure 3:
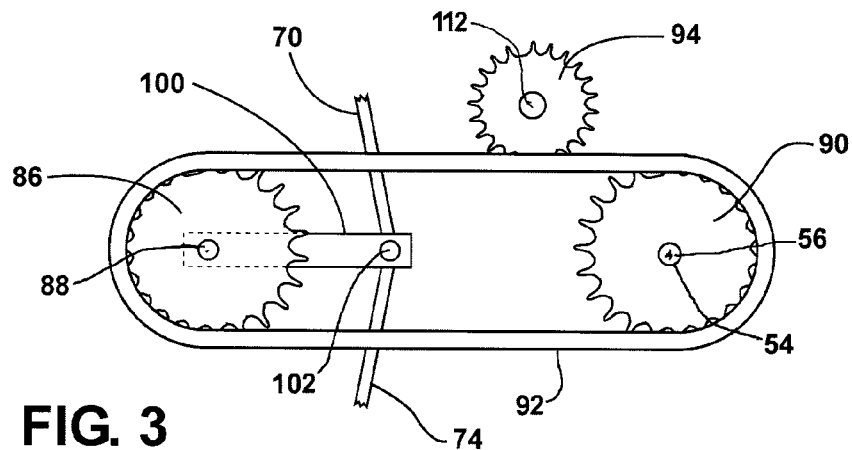
FIG. 3 is a schematic view of a portion of the front axle and steering system.
Figure 4:
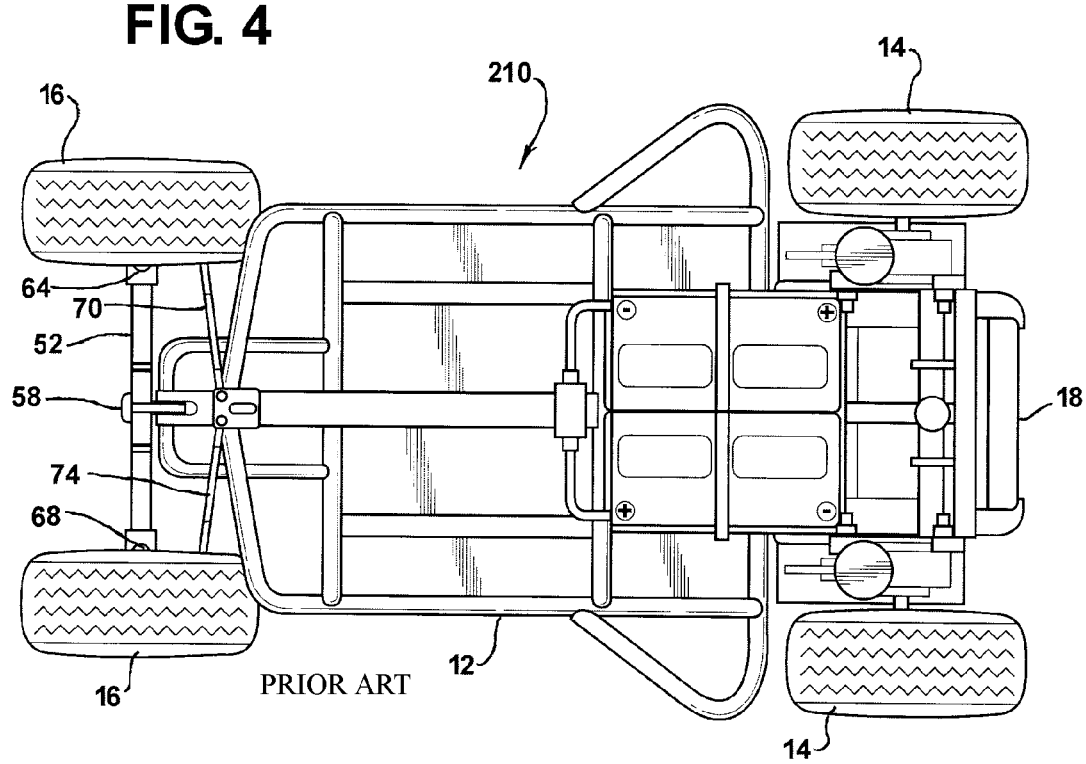
FIG. 4 is a bottom plan view of a one person golf cart.

A golf bag rack 20 is bolted to the rear of the mainframe 12. As shown in FIG. 2, the golf bag rack 20 is at the left rear of mainframe 12. The right side and the right rear portion of the golf cart are free to be used for swinging a golf club 22. The golf bag rack 20 can be shifted to the right rear of the mainframe 12 to free the left rear portion and the left side to be used for swinging a golf club 22.

A rear seat 24 is pivotally mounted on the rear portion of the mainframe 12 for pivotal movement about a vertical axis 26. The rear seat 24 has an upright back rest 28 and arm rests 30 and 32. A seat belt 34 with a large central lower torso panel 36 is provided. The seat belt 34 is employed to anchor a person to the seat bottom cushion 38 when a person is sitting on the bottom cushion as well as when a person is standing on the ground. A seat, similar to the rear seat 24 is disclosed in U.S. Pat. No. 5,732,788, the disclosure of which is incorporated herein by reference.

The rear seat 24 is rotatable 360° about the vertical axis 26. This permits a golfer to strike a golf ball with a golf club while supported by the rear seat 24. The golf ball can be on the right side, the left side or to the rear of the two person golf cart. The golf bag rack 20 is shiftable to positions in which it does not interfere with a golfer's swing of the club. When the golf cart is moving forward, the seat 24 is rotated about the axis 26 to a position in which the golfer is facing forward. The golfer's feet are supported on the foot rest surfaces 120 or 122 below the front seat bottom cushion when the rear seat 24 is facing forward.

A front seat post 40 is attached to the front portion of the mainframe 12 by bolts 42. A front seat bottom cushion 44 is attached to the upper end of the seat post 40. A front seat back rest 46 is pivotally attached to the front seat bottom 44 by pins 45. The pivotal connection permits pivotal movement of the back rest 46 between a generally vertical use position and a generally horizontal folded position resting on top of the bottom cushion 44. A foot platform support beam 48 is welded to a lower end of the front seat post 40. The platform support beam 48 extends upwardly and forwardly from the front seat post 40. A foot support plate 50 is clamped to the foot platform support beam assembly 48. The foot support plate 50 is forward of the front axle 52 and the steered front wheels 16. A steering tiller 54 is journaled in the central portion of the foot support plate 50. A tiller axis 56 extends upward and rearward from the foot support plate 50.

The front axle 52 is pivotally attached to the mainframe 12 by a pivot pin 58, for pivotal movement about a horizontal fore and aft axis 60. A left wheel spindle and yoke assembly 62 is pivotally attached to the left end of the front axle 52 by a left king pin 64. A right wheel spindle and yoke assembly 66 is pivotally attached to the right end of the front axle 52 by a right king pin 68. A left tie rod 70 is connected to an arm 72 integral with the left spindle and yoke assembly 62. A right tie rod 74 is connected to an arm 76 integral with the right spindle and yoke assembly 66. The inboard end of the left tie rod 70 and the inboard end of the right tie rod 74 are both connected to a tie rod control arm 100. The ends of the left and right tie rods 70 and 74 have ball joints 75. The tie rods 70 and 74 both have an adjustable length provided by adjustment threads 77 and lock nuts 79 for adjusting wheel toe in.

The tie rod control arm 100 is fixed to a shaft 88 and a driven sprocket 86. The shaft 88 is journaled in a tube 104 welded to the front seat post 40. The driven sprocket 86, the tie rod control arm 100 and the shaft 88 pivot together as one assembly to turn the steered front wheels 16 about the left king pin 64 and the right king pin 68. A steering tiller 54 is journaled on the frame 108, of the foot platform support beam assembly, that supports the front foot support plate 50, for pivotal movement about the tiller axis 56. The shaft 88 pivots about an axis that is parallel to the tiller axis 56. A drive sprocket 90 is fixed to the steering tiller 54 under the foot support plate 50. The compression springs 124, shown in FIG. 5 dampen pivotal movement of the front axle 52 about the pivot pin 58 or bolt.

An endless roller chain 92 is trained around the drive sprocket 90 and the driven sprocket 86. An idler sprocket 94 is adjustably clamped to a tube 110, welded to the frame member 108 of the foot platform support beam assembly 48, by a bolt 112. The idler sprocket 94 engages the roller chain 92 and tightens the roller chain.

The two person golf cart 10 for a passenger that is physically challenged travels at relatively slow speeds. It is not therefore necessary to provide the front axle 52 with a caster angle or a camber angle. If desired a camber angle can be provided by tilting the left king pin 64 and the right king pin 68 to position the tire tread in ground engagement inboard of the tread at the top of the tire a small distance. A caster angle can be provided by changing the orientation of the pivot pin or bolt 58 from horizontal to an orientation in which the pin extends downwardly and rearwardly a small angle from horizontal. The length of the tie rods 70 and 74 is adjustable as explained above.

Figure 5:
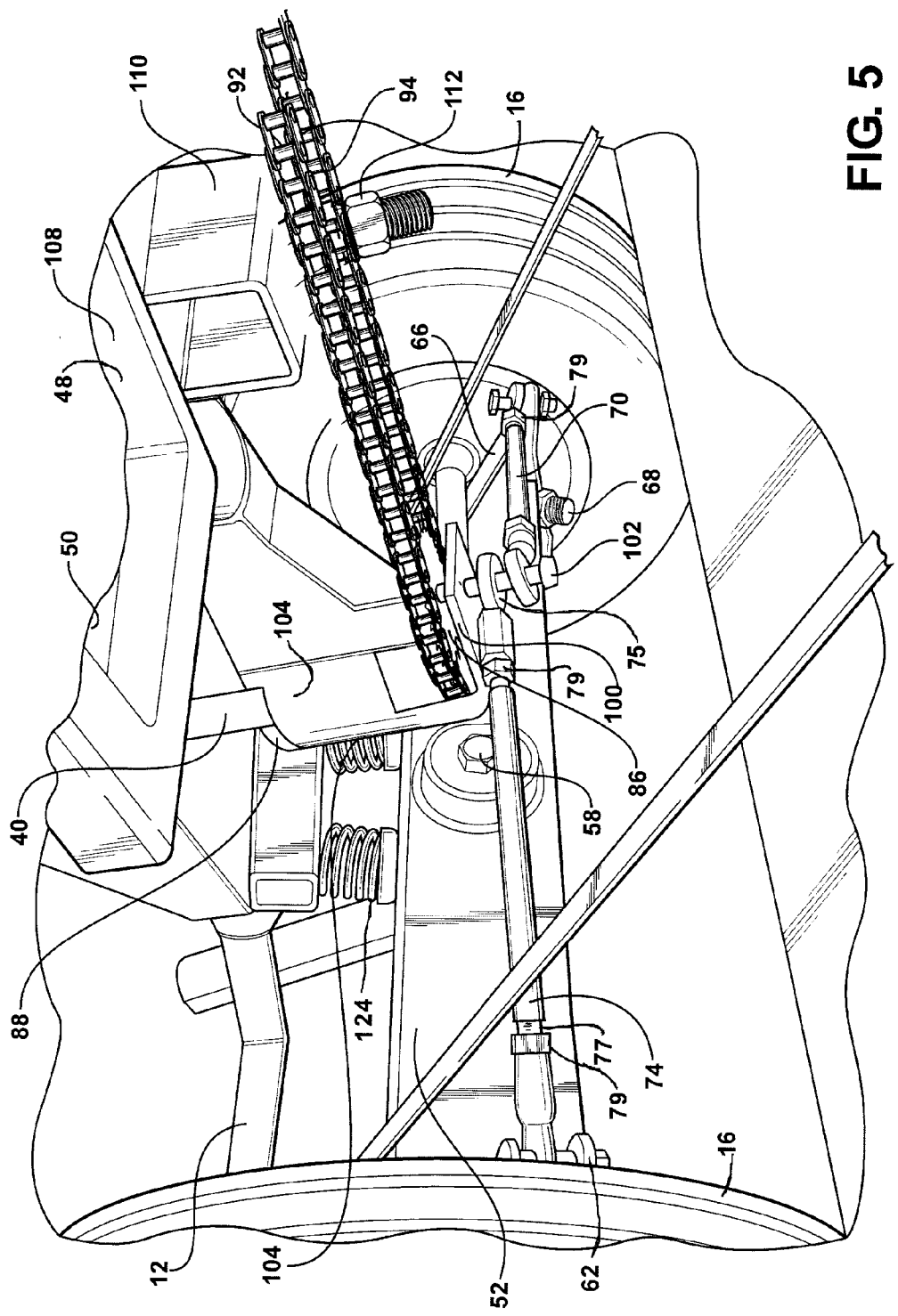
FIG. 5 is an enlarged perspective view of the front side of the front axle and a portion of the steering system with parts broken away.
Figure 6:
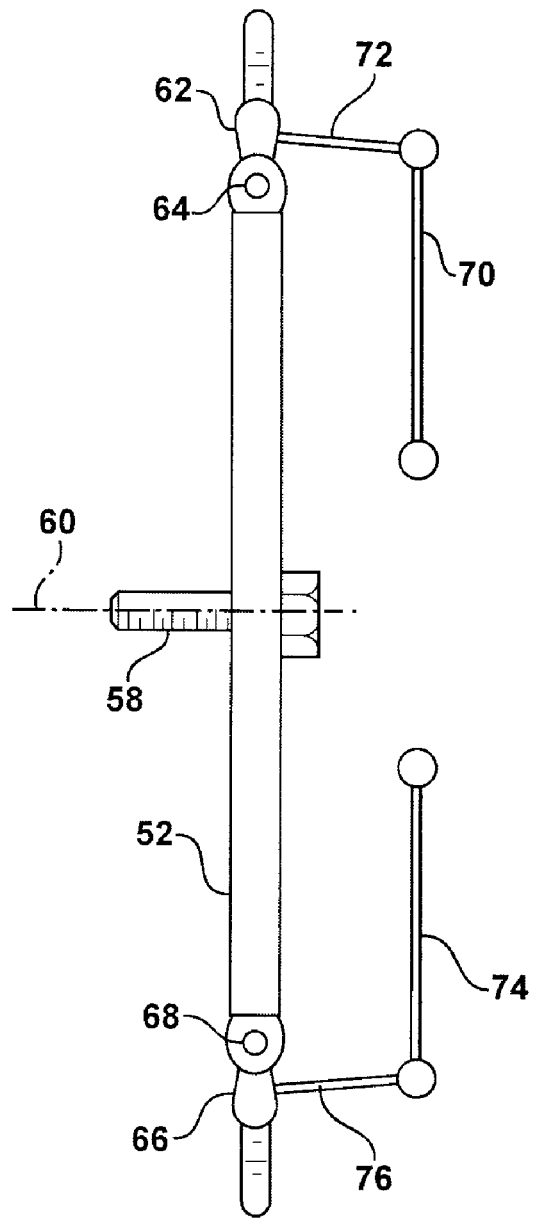
FIG. 6 is a schematic top plan view of the front axle assembly.

The front axle 52 as shown in FIG. 6 is on a one person golf cart 210. To convert a one person golf cart to a two person cart, the axle 52 is disconnected from the main frame, by removing the pivot pin 58, rotating the axle 180° about a vertical axis and then reconnecting the front axle to the main frame by the pivot pin. In the new position the left tie rod 70 and the right tie rod 74 are forward of the front axle 52 as shown in FIG. 5. The front seat post 40 with the frame assembly 48 is secured to the main frame 12 by bolts 42. The frame assembly 48 includes the tube 104, the frame members 108 and the foot support plate 50. The front seat 44 and 46 is attached to the front seat post 40. The tie rods 70 and 74 are attached to the tie rod control arm 100 by a bolt 102. If desired, two separate bolts 102 could be used to connect the tie rods 70 and 74 to the tie rod control arm 100.

The two person golf cart can be assembled in the factory. However kits can be provided to convert one person golf carts to two person golf carts. The kit includes the following components:

Front seat post 40
Foot platform support beam assembly 48
Shaft 88
Driven sprocket 86
Tie rod control arm 100
Steering tiller 54
Drive sprocket 90
Endless roller chain 92
Idler sprocket 94
Front seat bottom cushion 44
Front seal backrest 46
Bolts 42

The kit can be completely assembled in the factory. However, it is easier to package for shipment if the seat bottom cushion 44, seat backrest 46, and the steering tiller 54 are separate members in the kit. The drive sprocket 90 and the endless roller chain 92 are also separate parts.

Conversion of a one person golf cart to a two person golf cart requires removable of the steering tiller and the golf bag holder assembly from the front of the cart. The front axle 52 is removed, rotated 180° as explained above and pivotally attached to the main frame 12, with the tie rods 70 and 74 forward of the axle. The front seat post 40 is clamped to the main frame 12 by bolts 42. The seat components 44 and 46 are mounted on the upper end of the seat post 40. The inner ends of the tie rods 70 and 74 are clamped to the tie rod control arm 100. The steering tiller 54 is inserted through the passage through the foot support plate 50. The drive sprocket 90 is fixed to the lower end of the steering tiller 54. The roller chain is trained around the drive sprocket 90 and the driven sprocket 86. The idler sprocket 94 is positioned to properly tension the endless roller chain and clamped by the bolt 112 to maintain the tension. An electric cable 114 on the steering tiller is plugged into the power system to connect motor controls on the handle bar 96 to a power source and to the drive for the rear wheels 14.

The vertical axis 26 of the rear seat 24, the tiller axis 56 and the horizontal fore and aft axis 60 of the front axle 52 are all in a vertical fore and aft center plane.

I claim:

1. A two person golf cart comprising:
   a main frame with a rear frame portion supported by a left driven rear wheel and a right driven rear wheel and a front frame portion supported by a left steered front wheel and a right steered front wheel both of which are mounted on a front axle that is pivotally attached to the main frame by a pivot pin for pivotal movement about a generally horizontal fore and aft axis;
   a rear seat pivotally attached to the main frame for pivotal movement about a vertical axis to position physically challenged golfers in positions to swing golf clubs and hit golf balls on either side of the two person golf cart while at least partially supported by the rear seat;
   a rear foot rest surface on the main frame forward of the rear seat;
   a front seat post clamped to a forward portion of the main frame and including a foot platform support beam assembly attached to the front seat post and extending forward from a lower end of the front seat post and a front foot rest secured to the foot platform support beam assembly;
   a steering tiller journaled on the foot platform support beam assembly for pivotal movement about a tiller axis that extends upward and to the rear, a drive sprocket fixed to the steering tiller adjacent to a bottom side of the foot platform support beam assembly and pivotable about the tiller axis together with the steering tiller, a driven sprocket journaled on the front seat post to the rear of the drive sprocket for pivotal movement about a driven sprocket axis that is parallel to the tiller axis, an endless chain trained around the drive sprocket and the driven sprocket, a tie rod control arm secured to the driven sprocket and pivotable with the driven sprocket, a left tie rod connected to the tie rod control arm and to a left wheel spindle and yoke assembly, that rotatably supports the left steered front wheel, a right tie rod connected to the tie rod control arm and to a right wheel spindle and yoke assembly that rotatably supports the right steered front wheel, and wherein pivotal movement of the steering tiller will pivot the left wheel spindle and yoke assembly and the right wheel spindle and yoke assembly relative to the front axle;
   a front seat mounted on the front seat post; and
   wherein the front foot rest is a foot support plate secured to the foot platform support beam assembly and includes a foot support surface forward of and below the front seat.

2. A two person golf cart, as set forth in claim 1, wherein the rear foot rest surface extends forward and under the front seat.

3. A two person golf cart, as set forth in claim 1, wherein the generally horizontal fore and aft axis about which the front axle pivots, the vertical axis about which the rear seat pivots and the tiller axis are in a common vertical plane through a fore and aft center of the two person golf cart.

4. A two person golf cart, as set forth in claim 1, wherein the front seat includes a front seat bottom cushion and a front seat backrest that is pivotally attached to the front seat bottom cushion for pivotal movement between an upright use position and a generally horizontal forward storage position.

5. A two person golf cart, as set forth in claim 1, wherein the left tie rod and the right tie rod both include a tie rod length adjustment.

6. A two person golf cart comprising:
   a mainframe with a main frame rear portion supported by a left driven rear wheel and a right driven rear wheel;
   a front axle pivotally attached to the main frame by a pivot pin for pivotal movement about a generally horizontal fore and aft axis;
   a left spindle and yoke assembly having a left yoke pivotally attached to a front axle left end by a left king pin for pivotal movement about a generally vertical left king pin axis, a left arm integral with the left spindle and yoke assembly and extending forwardly from the left spindle and yoke assembly, a left steered front wheel journaled on a left spindle of the left spindle and yoke assembly and supporting the front axle left end;
   a right spindle and yoke assembly having a right yoke pivotally attached to a front axle right end by a right king pin for pivotal movement about a generally vertical right king pin axis, a right arm integral with the right spindle and yoke assembly and extending forwardly from the right spindle and yoke assembly, a right steered front wheel journaled on a right spindle of the right spindle and yoke assembly and supporting the front axle right end;
   a rear seat pivotally attached to the main frame for pivotal movement about a vertical axis to position physically challenged golfers in positions to swing golf clubs and hit golf balls on a left side, a right side and rearward of a rear end of the two person golf cart while at least partially supported by the rear seat;

a rear foot rest surface on the main frame forward of and below the rear seat;

a front seat post clamped to a forward portion of the main frame and including a foot platform support beam assembly welded to a front post lower portion and extending forwardly and upwardly from the front post lower portion, and a front foot rest secured to the foot platform support beam assembly;

a steering tiller journaled on the foot platform support beam assembly for pivotal movement about a tiller axis that extends upward and rearward and a drive sprocket fixed to the steering tiller adjacent to a bottom side of the foot platform support beam assembly and pivotable about the tiller axis together with the steering tiller;

a driven sprocket mounted on a driven sprocket shaft that is journaled on the front seat post to the rear of the drive sprocket for pivotal movement about a driven sprocket shaft axis that is parallel to the tiller axis, a tie rod control arm fixed to the driven sprocket shaft and the driven sprocket and pivotable with the driven sprocket shaft and the driven sprocket about the driven sprocket shaft axis;

an endless roller chain trained around the drive sprocket and the driven sprocket and an idler sprocket journaled on the foot platform support beam assembly and engaging the endless chain between the drive sprocket and the driven sprocket to tension the endless roller chain;

a left tie rod connected to the left arm of the left spindle and yoke assembly and to the tie rod control arm by a first left tie rod ball joint and a second left tie rod ball joint;

a right tie rod connected to the right arm of the right spindle and yoke assembly and to the tie rod control arm by a first right tie rod ball joint and a second right tie rod ball joint and wherein pivotal movement of the steering tiller will pivot the left spindle and yoke assembly, the left steered front wheel, the right spindle and yoke assembly and the right steered front wheel relative to the front axle; and a front seat mounted on a front seat post upper end with the front seat above the front foot rest.

7. A two person golf cart, as set forth in claim 6, wherein the rear foot rest surface extends forward and under the front seat.

8. A two person golf cart, as set forth in claim 6, wherein the generally horizontal fore and aft axis about which the front axle pivots, the vertical axis about which the rear seat pivots and the tiller axis are in a common vertical plane through a fore and aft center of the two person golf cart.

9. A two person golf cart, as set forth in claim 6, wherein the front seat includes a front seat bottom cushion and a front seat backrest that is pivotally attached to the front seat bottom cushion for pivotal movement between an upright use position and a generally horizontal forward storage position.

10. A two person golf cart, as set forth in claim 6, wherein the left tie rod includes a left tie rod length adjustment and the right tie rod includes a right tie rod length adjustment.

11. A method of converting a one person golf cart to a two person golf cart comprising:

removing a front axle from a main frame of a one person golf cart;

orienting the front axle with a left arm of a left arm of a left wheel spindle and yoke assembly extending forwardly;

orienting the front axle with a right arm of a right wheel spindle and yoke assembly extending forwardly;

pivotally attaching the front axle to a front frame portion of the main frame for pivotal movement about a generally horizontal fore and aft axis;

clamping a front seat post to the main frame with a foot platform support assembly attached to a lower portion of the front seat post extending forwardly and upwardly, a steering tiller journaled on the foot platform support assembly for pivotal movement about a tiller axis that extends upward and rearward, a drive sprocket mounted on the steering tiller and rotatable with the steering tiller, a driven sprocket journaled on the front seat support for pivotal movement about a driven sprocket axis that is parallel to the tiller axis and forward of the tiller axis, an endless roller chain trained around the drive sprocket and the driven sprocket, and a tie rod control arm fixed to the driven sprocket;

connecting a left tie rod to the left tie rod control arm and to the left arm of the left wheel spindle and yoke assembly;

connecting a right tie rod to the tie rod control arm and to the right arm of the right wheel spindle and yoke assembly; and mounting a front seat on an upper portion of the front seat post.

\* \* \* \* \*